United States Patent
Devitt et al.

(10) Patent No.: US 7,346,561 B1
(45) Date of Patent: Mar. 18, 2008

(54) RULE-BASED ON-LINE PRODUCT SELECTION

(75) Inventors: Mara Q. Devitt, Hinsdale, IL (US); Steven W. Louis, Columbus, OH (US); Michael J. Willow, Naperville, IL (US); Chad R. Wulf, Columbus, OH (US); Jitin Handa, Streamwood, IL (US); Dadong Wan, Palatine, IL (US)

(73) Assignee: Accenture Global Services, GmbH, Schaffhausen (CH)

( * ) Notice: Subject to any disclaimer, the term of this patent is extended or adjusted under 35 U.S.C. 154(b) by 371 days.

(21) Appl. No.: 09/910,159

(22) Filed: Jul. 20, 2001

Related U.S. Application Data

(63) Continuation-in-part of application No. 09/798,232, filed on Mar. 2, 2001, now Pat. No. 7,194,428.

(51) Int. Cl.
  *G06Q 30/00* (2006.01)
(52) U.S. Cl. .......................................... 705/27; 705/29
(58) Field of Classification Search .................. 705/26, 705/27, 28, 29; 700/97, 98, 130
  See application file for complete search history.

(56) References Cited

U.S. PATENT DOCUMENTS 5,680,528 A * 10/1997 Korszun ..................... 345/630
5,785,181 A * 7/1998 Quartararo, Jr. ............. 209/3.3
5,850,222 A * 12/1998 Cone .......................... 345/418
5,930,769 A * 7/1999 Rose ........................... 705/27
5,962,834 A * 10/1999 Markman .................... 235/385
6,259,399 B1 * 7/2001 Krasner ................. 342/357.06
6,307,568 B1 * 10/2001 Rom .......................... 345/629
6,313,745 B1 * 11/2001 Suzuki .................... 340/572.1
6,415,199 B1 * 7/2002 Liebermann ................ 700/132
6,546,309 B1 * 4/2003 Gazzuolo .................... 700/132
6,665,577 B2 * 12/2003 Onyshkevych et al. ..... 700/130
6,801,223 B1 * 10/2004 Abbott et al. ............... 715/740
6,842,116 B2 * 1/2005 Hum et al. ............... 340/573.4
6,901,379 B1 * 5/2005 Balter et al. .................. 705/27

OTHER PUBLICATIONS

Computergram International, "Never Mind Virtuasl Games-Virtual Wardrope", Feb. 24, 1995.*
McMillin, "On Line shopping expected to Grow", Tribune Business News, Dec. 19, 1998.*

* cited by examiner

*Primary Examiner*—Gerald J. O'Connor
(74) *Attorney, Agent, or Firm*—Banner & Witcoff, Ltd.

(57) ABSTRACT

Systems and methods that assist users in the selection of products such as clothing and accessories are provided. A database of rules for selecting combinations of clothing and accessories is coupled to an inference engine server. A user may transmit a search request to the inference engine server. The inference engine server then access the rules and the search request and performs the search in accordance with the rules. The results of the search may then be displayed to the user as recommendations.

16 Claims, 8 Drawing Sheets

RULE-BASED ON-LINE PRODUCT SELECTION

This application is a continuation-in-part of U.S. patent application Ser. No. 09/798,232, entitled "Online Wardrobe" and filed on Mar. 2, 2001 now U.S. Pat. No. 7,194,428, the entire disclosure of which is hereby incorporated by reference.

FIELD OF THE INVENTION

This invention relates generally to inference engines and the identification of consumer products that satisfy a set of rules. More particularly, the invention provides methods and systems for making product selection decisions.

BACKGROUND OF THE INVENTION

For some people, purchasing and selecting clothing to wear can be time-consuming tasks. It is often difficult for people to optimize the number of possible clothing combinations consumers have in their current wardrobe. Similarly, it can also be difficult for consumers to select clothing to purchase. There are a number of different decisions that are made when selecting clothing to wear and purchase. Factors such as, color, style and weather must be taken into account. Furthermore, it can be time consuming and difficult to stay informed about current fashion trends to ensure that one is dressed properly and makes proper purchasing decisions.

It can be prohibitively time consuming to evaluate every possible combination of clothing in a person's wardrobe to select a combination to wear. Time can be saved by not spending much time evaluating a clothing combination that a person wishes to wear or purchase. Unfortunately, this can lead to the person wearing or purchasing a combination of clothing that is not desirable.

Therefore, there exists a need in the art for a system and methods that assist a user in selecting clothing combinations to purchase and wear in a timely manner.

BRIEF SUMMARY OF THE INVENTION

The present invention provides systems and methods that assist users in selecting clothing to wear and purchase. Among other advantages, the disclosed systems and methods reduce the time required by users to select clothing and accessories.

In one embodiment, the advantages of the present invention are realized by a method of identifying clothing combinations. The method includes the step of identifying a first article of clothing and a search request. A set of rules for selecting clothing combinations is also identified. Next, the identification of the first article of clothing, the search request and the identification of the set of rules are transmitted to a rules engine. An identification of a second article of clothing that satisfies the set of rules is then received.

The set of rules may include any type of rules, such as, for example, rules for permissible color combinations, permissible pattern combinations, and permissible style combinations.

In another embodiment of the invention, a method of selecting clothing combinations is provided. The method includes the step of receiving from an input device a query including characteristics of a first article of clothing, the identification of a user and a search request. A set of rules associated with the user and for determining permissible clothing combinations are accessed. Next, the rules and the characteristics of the first article of clothing are utilized to identify a second article of clothing that forms an appropriate clothing combination with the first article of clothing. An identification of the second article of clothing may be transmitted to the input device.

In yet another embodiment of the invention, a method of selecting clothing that may be of interest to a user is provided. The method comprises the step of receiving from an input device a query including the identification of a user and a search request. A set of rules associated with the user and for determining desirable clothing combinations are accessed and the rules and the search request are utilized to identify an appropriate clothing combination. Then, an identification of clothing combination is transmitted to the input device.

The rules may require elements comprising the clothing combination to be intended for the same gender, to be intended for the same occasion, to be of the same style and/or to be intended for the same body type.

A method of selecting clothing that may be of interest to a user is disclosed in another embodiment of the invention. The method includes receiving clothing attributes for a clothing combination selected by a user and generating a rule for the selection of additional clothing combinations based on the attributes of the clothing combination selected by the user. A query including the identification of a user and a search request is received from an input device and a set of rules associated with the user and that includes the generated rule are accessed. Next, the set of rules and the search request are utilized to identify an appropriate clothing combination and an identification of clothing combination is transmitted to the input device.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
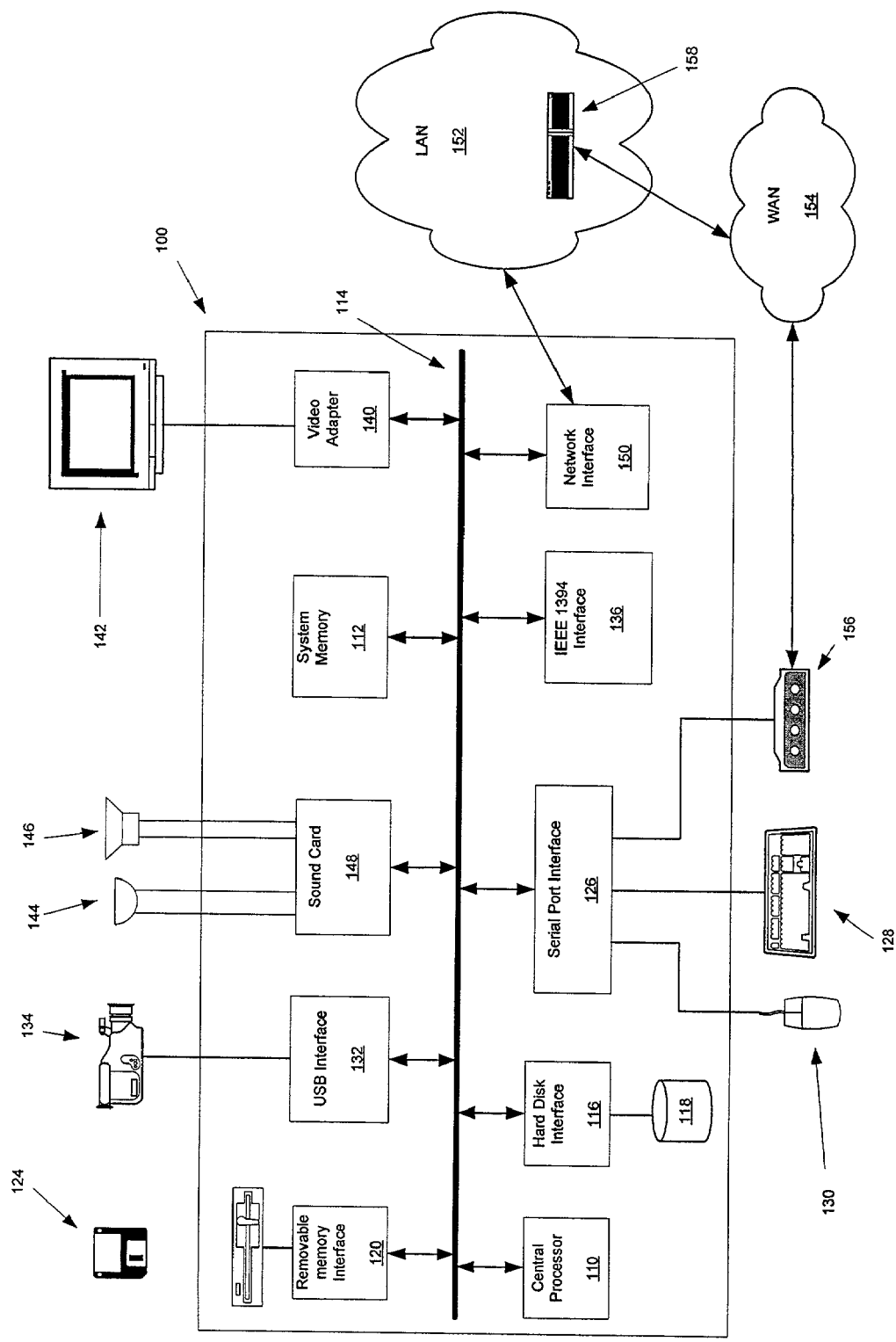
FIG. 1 shows a typical prior art workstation and communication connections.

Elements of the present invention may be implemented with computer systems, such as the system 100 shown in FIG. 1. Computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 118 and a single removable memory drive 122 are shown for illustration purposes only and with the understanding that computer 100 may include several of such drives. Furthermore, computer 100 may include drives for interfacing with other types of computer readable media.

A user can interact with computer 100 with a variety of input devices. FIG. 1 shows a serial port interface 126 coupling a keyboard 128 and a pointing device 130 to system bus 114. Pointing device 128 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 1 shows a universal serial bus (USB) interface 132 coupling a video or digital camera 134 to system bus 114. An IEEE 1394 interface 136 may be used to couple additional devices to computer 100. Furthermore, interface 136 may configured to operate with particular manufacture interfaces such as FireWire developed by Apple Computer and i.Link developed by Sony. Input devices may also be coupled to system bus 114 through a parallel port, a game port, a PCI board or any other interface used to couple and input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 166. A sound card 148 may be used to couple microphone 144 and speaker 146 to system bus 114. One skilled in the art will appreciate that the device connections shown in FIG. 1 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer 100. FIG. 1 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 1 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, data structures, etc., that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

Figure 2:
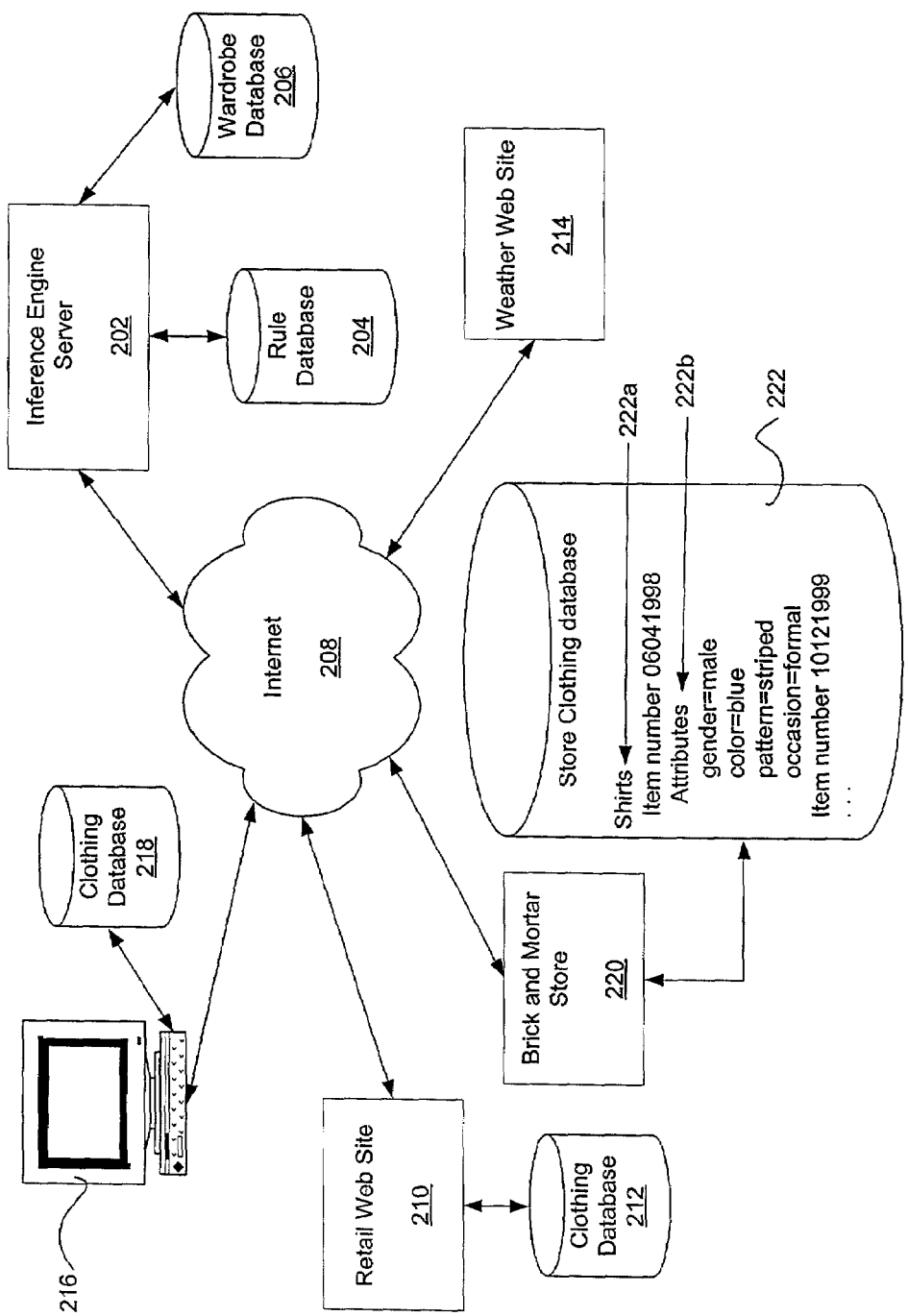
FIG. 2 illustrates a system that may be used to assist a user in selecting clothing combinations to wear and purchase in accordance with an embodiment of the invention.

FIG. 2 illustrates a system that assists a user in selecting clothing to purchase and/or wear. An inference engine server 202 receives requests for the identification of clothing and clothing combinations. A rule database 204 may contain one or more rules used by inference engine server 202 to select clothing. There are a number of conventional software platforms that receive queries, access rules and produce a response to the query based upon the information contained in the rules. Examples of suitable software platforms that can be used to implement aspects of the present invention are offered for sale by Blaze Software and Blue Martini. A wardrobe database 206 may be included to store the identification of clothing owned by a user and associated clothing attributes. Retailers may provide clothing information to wardrobe database 206 at the time that users purchase clothing. Alternatively, users may provide clothing information to wardrobe database 206. The operation of inference engine 202, rule database 204 and wardrobe database 206 will be described in detail below.

One skilled in the art will appreciate that numerous different web sites and sources of information may be connected to the Internet 208. FIG. 2 shows a retail web site 210 and a weather web site 214 coupled to Internet 208. Retail web site 210 may offer clothing items for sale and may be coupled to a clothing database 212 that may contain the identification of clothing offered for sale and associated clothing attributes. A weather web site 214 may provide weather information. Of course, a single web site may offer clothing for sale and provide weather information.

A computer 216 may be utilized to interface with inference engine server 202. A database of clothing 218 may be coupled to computer 216. In an alternative embodiment, database 218 can be removed and clothing information is stored in a remote database, such as wardrobe database 206. In embodiments in which computer 216 is implemented with a portable wireless device, database 218 and/or database 206 may be coupled to computer 216 via the Internet. In alternative embodiment of the invention, computer 216 may be included in the wardrobe closet disclosed in co-pending U.S. patent application Ser. No. 09/798,232, entitled "Online Wardrobe" and may be configured to perform some or all of the functions of inference engine server 202.

One or more conventional brick and mortar stores 220 that allow consumers to view merchandise in person may also be connected to the Internet 208. Brick and mortar store 220 may offer clothing for sale in the store and/or on-line to users connected to the Internet 208. Brick and mortar store 220 may be coupled to a store clothing database 222 that contains the identification of clothing offered for sale and associated clothing attributes. Database 222 illustrates an example of the type of information that may be included in databases, 206, 212, 218 and 222. Two shirts, having item numbers 06041998 and 10121999, are shown under a shirts heading 222a. Several attributes of item number 06041998 are listed under an attributes heading 222b. Of course, additional attributes, shirts as well as additional clothing types and accessories may also be included.

Figure 3:
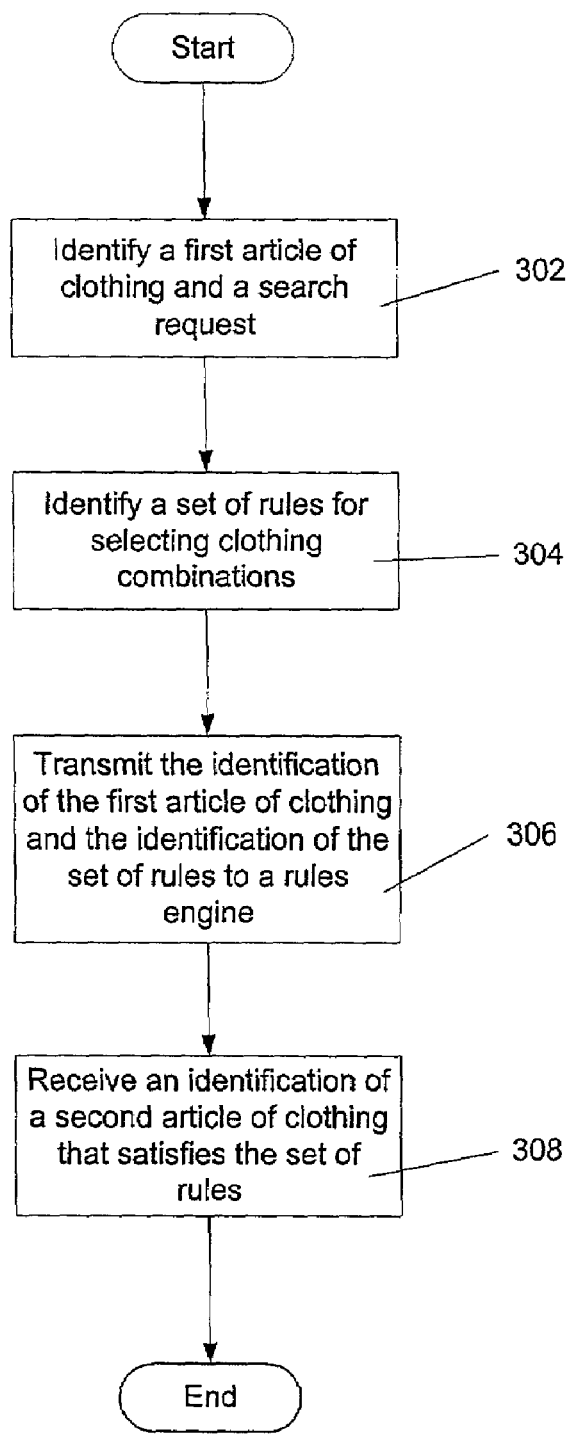
FIG. 3 illustrates a method of selecting an article of clothing in accordance with an embodiment of the invention.

FIG. 3 illustrates a method for assisting a user in selecting articles of clothing. First, in step 302, an article of clothing and a search request are identified. The article of clothing may be identified by selecting an item in a database, reading a tag embedded in the clothing, entering identifying information into a computer terminal or any other manner.

Figure 4:
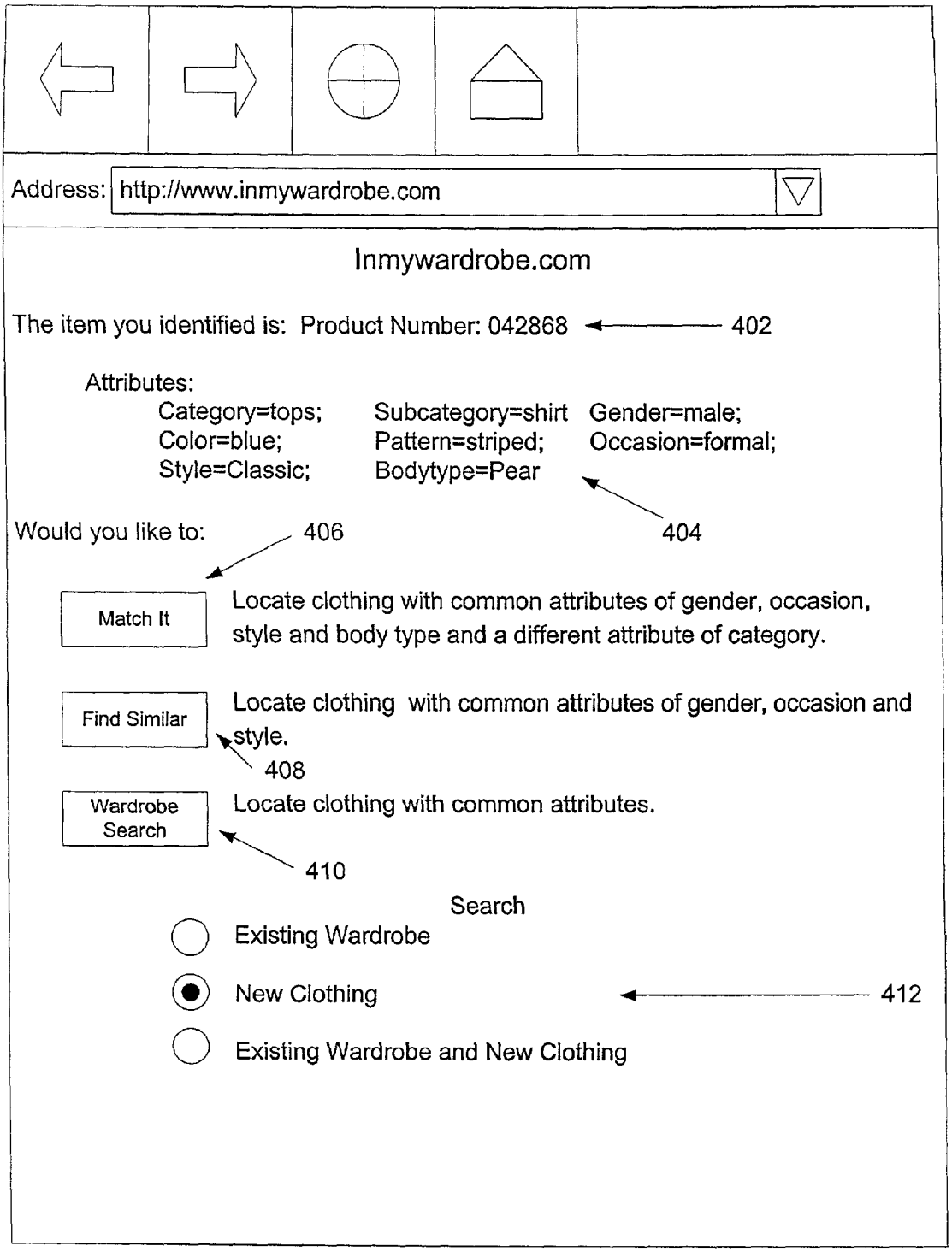
FIG. 4 shows a graphical user interface that may be used to assist users in selecting clothing in accordance with an embodiment of the invention.

FIG. 4 illustrates a web page that may be used as an interface for identifying clothing and a search request. The item may be identified by entering a product number 402. A list of potential attributes for the identified product are shown in an attributes section 404. However, any attributes can be used. The attributes shown in FIG. 4, as well as additional attributes will be described in detail below. The user may select a Match It button 406 to find another article of clothing with common attributes of gender, occasion, style and body type and a different attribute or category. For example, the user may desire to find pants that match the identified shirt. A Find Similar button 408 may be selected to locate clothing with common attributes of gender, occasion and style. This option may be used when shopping to determine if the user already owns a similar article of clothing. A Wardrobe Search button 410 may be selected to locate clothing that meets required criteria. A user may use this option to confirm that they own a particular article of clothing. For example, the user may identify a shirt in brick and mortar store 220 and search their wardrobe to determine if they own a similar shirt.

A search section 412 allows the user to search their existing wardrobe, new clothing or both. A user may desire to search his or her existing wardrobe when selecting clothes to wear in the near future. The new clothing option may be selected when the user desires to search web sites selling clothing. In one embodiment of the invention, the user identifies web sites to search when the new clothing option is selected.

Returning to FIG. 3, in step 304, a set of rules are identified. The set of rules may be identified by the user explicitly identifying the rules or may be inferred from the information provided by the user. In one embodiment, the user may provide: the user's identification, an identification of clothing or clothing attributes, and the type of search request. Inference engine server 202 may use this information to retrieve a set of rules and the order of the rules. Alternatively, the set of rules may be identified by identifying the user and associating the user with a set of rules. The set of rules may be used to select clothing based on: one or more attributes of the clothing, one or more attributes of the user and/or one or more attributes of the situation in which the clothing will be worn.

Figure 5:
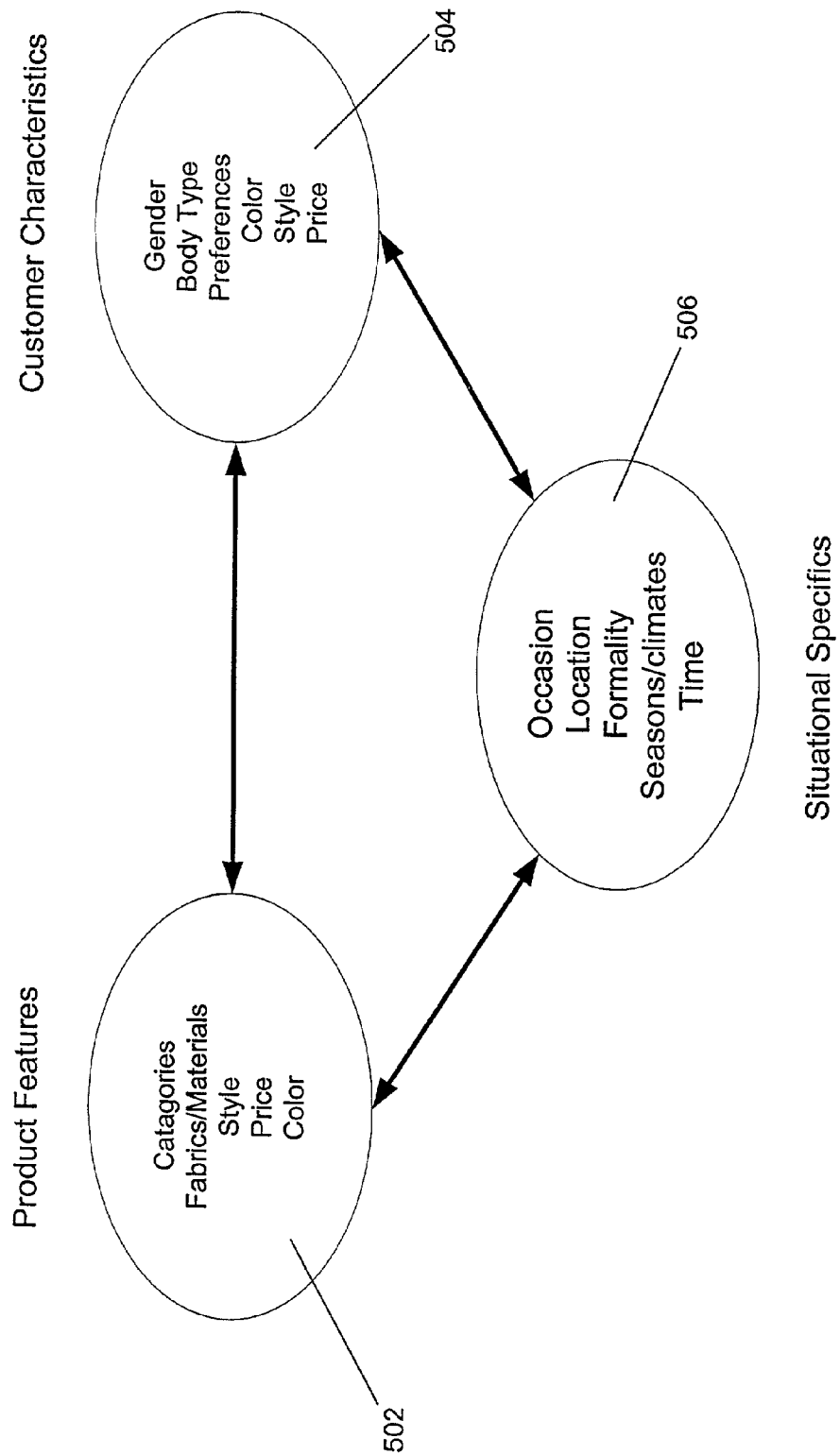
FIG. 5 illustrates the relationships between product, customer and situational specific attributes.

FIG. 5, illustrates the relationship between exemplary product attributes 502, customer attributes 504 and situational specific attributes 506. One skilled in the art will appreciate that embodiments of the present invention can be implemented with methods that utilize a variety of different product, customer and situational specific attributes. Attributes that may be used include: gender (male, female, unisex), skin tone, hair and eye colors, occasion (formal events, work, casual, evening events), general style (classic, global, romantic, natural, urban, casual), price and pattern (solid, patterned). Users may also choose a body type that is most closely related to their shape. Females may choose from: rectangle (balanced hip and shoulder, no defined waist), pear (shoulder narrower than hips, small waist, full hips), hourglass (balanced hip and shoulder width, defined waist), triangle (shoulder narrower than hips, full waist), inverted triangle (shoulder wider than hips) and round (wide shoulders, round back, thin legs). Males may choose from: slim (slender), regular (proportional), portly (bulky) and athletic (muscular).

Articles of clothing may also be assigned an attribute value indicating an appropriate climate to utilize the clothing. The values may include cold (45° F. or less), mild (45° F.-65° F.), warm (65° F.-75° F.), hot (75° F. or above) and all-year (all temperatures). Category attributes may include outerwear (jackets, coats), tops (blouses, shirts, casual tops, sweaters), bottoms (dress pants, casual pants, skirts), outfits (suits, dresses, one-piece coordinates), accessories (belts, handbags, scarves, wraps, hosiery, hats, jewelry, gloves) and shoes (sandal, boot, loafer, dress, athletic). Subcategory attributes may include:

| | |
|---|---|
| Outerwear: | |
| Blazers | sports jacket often with notched collar and patch pockets |
| Outerwear Tops: | worn over an outfit to protect from elements |
| Blouses and Shirts | BLOUSE: a usually loose-fitting garment especially for women that covers the body from the neck to the waist SHIRT: a cloth garment usually having a collar, sleeves, a front opening, and a tail long enough to be tucked inside trousers or a skirt |
| Casual Tops | a top, generally from cotton, cotton blend, lycra or spandex |
| Sweaters | a knitted or crocheted jacket or pullover |
| Sweatshirts | a loose collarless pullover usually of heavy cotton jersey |
| Bottoms: | |
| Dress Pants | |
| Casual Pants | |
| Skirts | a garment hanging from the waist and worn by women and girls |

-continued

| | |
|---|---|
| Outfits: | |
| Suits | a set of matching outer garments, especially one consisting of a coat with trousers or a skirt |
| Dresses | a girl's or woman's one-piece garment consisting of a blouse connected to the waist of a skirt |
| One piece coordinates | |
| Accessories: | |
| Belts | a strip of flexible material worn especially around the waist |
| Handbags | a bag held in the hand or hung from a shoulder strap and used for carrying small personal articles and money |
| Scarves/Wraps | a long piece of cloth worn about the head, neck, or shoulders |
| Hosiery | socks and stockings; hose |
| Hats | a covering for the head, especially one with a shaped crown and brim |
| Jewelry | ornaments such as rings, bracelets, and necklaces, sometimes set with jewels; jewels or jewel-set ornaments collectively |
| Gloves | a covering for the hand, usu. made of cloth or leather and having separate sections for each finger and the thumb |
| Shoes: | |
| Sandal | a shoe consisting of a sole strapped to the foot |
| Boot | a covering for the foot and all or some of the leg, usu. made of leather or rubber and worn for protection |
| Loafer | a trademark used for a low leather step-in shoe with an upper resembling a moccasin but with a broad, flat heel |
| Dress | |
| Athletic | a cloth sports shoe with a sole made of rubber or similar material |

Each item may also be assigned one or more clothing attributes. A "color" attribute may correspond to colors defined by the National Retail Federation. Patterned items may be assigned a color attribute corresponding to the predominate color of the item.

Material attributes may correspond to the material makeup of the item as listed by the manufacturer or store. Values are included in the following table and may be used to assign climate attributes.

| | |
|---|---|
| Acrylic | artificial fiber made from a special group of vinyl compounds, primarily acrylonitrile. Acrylic fibers are thermoplastic (i.e., soften when heated, reharden upon cooling), have low moisture regain, are low in density, and can be made into bulky materials. They wash and dry easily and are dimensionally stable. They are resistant to bleaches, dilute acids, and alkalies, and to weathering and microbiological attack |
| Angora | the hair of the angora goat or of the angora rabbit |
| Beaded | to furnish, adorn, or cover with beads or beading |
| Boucle | an uneven yarn of three plies one of which forms loops at intervals |
| Blend | a mixture of 2 or more materials |
| Camelhair | a soft tan cloth made with the hair of a camel |
| Canvas | strong rough cloth made from cotton, hemp or jute, used for making tents, sails, bags or strong clothes |
| Cashmere | very soft, expensive woollen material that is made from the hair of goats from kashmir |
| Chenille | a wool, cotton, silk, or rayon yarn with protruding pile; also: a pile-face material with a filling of this yarn |
| Chiffon | a very thin, almost transparent cloth of silk or nylon |
| Corduroy | a durable usually cotton pile material with vertical ribs or wales |
| Cotton | (the thread or cloth made from) the fibre surrounding the seeds of a tall plant which is cultivated esp. in the USA, China and India |
| Crepe | a light crinkled material woven of any of various fibers |
| Crocodile | the skin or hide of a crocodile |

-continued

| | |
|---|---|
| Denim | a thick strong cotton cloth, often blue in colour, used esp. for making jeans |
| Diamond | a geometric shape with four equal straight sides, two equal, opposed acute angles, and two equal, opposed obtuse angles |
| Down | the fine, soft, fuzzy feathers that cover a young bird or that are found on the underside of adult birds |
| Faux Fur | synthetic material imitating the skin of an animal |
| Felt | a non-woven material made of matted, compressed animal fibers, another matted material resembling it, or an article made of it |
| Flannel | a soft, heavy material made of wool, cotton, synthetics, or a blend of these, used esp. for warm clothing or bed covering |
| Fur | or the hair-covered skin(s) of animals, removed from their bodies |
| Gold | a metallic yellow color like that of gold metal |
| Jersey | a plain weft-knitted material made of wool, cotton, nylon, rayon, or silk and used especially for clothing |
| Lace | a decorative cloth which is made by weaving thin thread in delicate patterns with holes in them |
| Leather | animal skin treated in order to preserve it, and used to make shoes, bags, clothes, equipment, etc. |
| Linen | strong cloth that is woven from the fibres of the flax plant and lasts a long time, or sheets, cloths and clothing made from this or from a similar material such as cotton |
| Lizard | the skin of a lizard made into leather |
| Lycra | used for a spandex synthetic fiber |
| Mohair | (a soft cloth made from) the silky outer hair of angora goats |
| Nylon | an artificial substance used esp. to make clothes, ropes and brushes |
| Organza | a sheer, stiff material of silk or synthetic material used for trimming, neckwear, or evening dresses |
| Patent | leather that is treated in a formerly patented process to achieve a hard, glossy, usu. black finish |
| Polyester | any of numerous synthetic polymers produced chiefly by reaction of dibasic acids with dihydric alcohols and used primarily as light, strong, weather-resistant resins in boat hulls, textile fibers, adhesives, and molded parts |
| Poplin | a ribbed material of silk, rayon, wool, or cotton, used in making clothing and upholstery |
| Rayon | any of several synthetic textile fibers produced by forcing a cellulose solution through fine spinnerets and solidifying the resulting filaments |
| Satin | a smooth material that is shiny on one side and dull on the other |
| Seersucker | a light thin material, generally cotton or rayon, with a crinkled surface and a usually striped pattern |
| Shantung | a heavy material with a rough nubby surface, made of spun wild silk |
| Silk | a fine lustrous fiber composed mainly of fibroin and produced by certain insect larvae to form cocoons, especially the strong, elastic, fibrous secretion of silkworms used to make thread and material |
| Silk Knit | to interlock or join silk together cohesively |
| Silk Thick | silk that is relatively great in the measure of the smallest dimension from one side to the opposite side |
| Snakeskin | the skin of a snake, or leather made from this |
| Spandex | a synthetic fiber or material made from a polymer containing polyurethane, used in the manufacture of elastic clothing |
| Straw | stalks of threshed grain, used as bedding and food for animals, for thatching, and for weaving or braiding, as into baskets |
| Suede | a soft napped leather, or a similar-looking material |
| Synthetic Fibers | material weaved from man-made materials |
| Tulle | a fine, often starched net of silk, rayon, or nylon, used especially for veils, tutus, or gowns |
| Tweed | a coarse, rugged, often nubby woolen material made in any of various twill weaves and used chiefly for casual suits and coats |
| Velvet | a soft material, such as silk, rayon, or nylon, having a smooth, dense pile and a plain underside |
| Wool | fiber made from the fleece of the domestic sheep |
| Wool Crepe | wool material with a wrinkled or ridged surface |
| Wool Knit | to interlock or join wool together cohesively |
| Wool Lightweight | thin wool material |

Length attributes may also be assigned to pants, skirts, tops, dresses, suits and outerwear. Pants may be assigned values of short (ends at least 2 inches above knee), clamdigger (ends 3-5 inches above the ankle), capri (end below the knee to mid-calf), ankle (end at ankle), regular (end 1-2 inches below ankle) or long (end more than 2 inches below ankle). Skirts may be assigned values of: above knee, at knee, below knee or ankle. Tops and suits may be assigned values of: ¾ (sleeve ends between wrist and elbow), elbow (sleeve ends at elbow joint), S/S (sleeve ends between shoulder and elbow), L/S (sleeve ends at wrist) or sleeveless (sleeve ends at shoulder). Dresses may be assigned values of: above knee, at knee, below knee and ankle. Outerwear may be assigned values of: waist (ends at waist), hips (ends at hips), thigh (ends mid thigh), knee (ends at knee) or full (ends at ankle)

Fit attributes may be determined by an item's silhouette. Exemplary values for pants, skirts, tops, dresses, suits and outerwear are found in the following tables.

Pants:

| | |
|---|---|
| Slim | cut close to body |
| Baggy | cut loosely |
| Straight | pant leg same length throughout |
| Boot Leg | cut with slight flair at bottom of leg |
| Tapered | slightly inverted at bottom of leg |
| Bellbottom | cut with substantial flair at bottom of leg |

Skirts:

| | |
|---|---|
| A-line | cut in triangle |
| Straight | same shape throughout |
| Full | skirt is fuller at the bottom |
| Flared | straight until bottom where skirt becomes full |
| Tailored | skirt is custom fit to curves of body |
| Wrapped | skirt is wound 1½ times around body |
| Pleated | small vertical folds throughout material |

Tops:

| | |
|---|---|
| Wrapped | more than one fold of Material across chest |
| Fitted | tight cut close to body |
| Tunic | a long, plain, sleeved or sleeveless blouse |
| Regular | fit in general style of the season |
| Boxy | square but, loose fit |
| Belted | cinched at waist |

Dresses:

| | |
|---|---|
| A-line | cut in shape of a triangle; ends at or above knee |
| Straight | cut without curves |
| Full | loosely cut |
| Trapeze | material gathered at chest or above falling in tent like shape around body |
| Contoured | shaped to curves of body |

-continued

| | |
|---|---|
| Belted | cinched at waist |
| Wrapped | dress folds at least 1½ times around body |

Suits:

| | |
|---|---|
| Tailored | custom fitted to curves of body |
| Boxy | broad shoulders, straight cut |
| Contoured | fitted to show curves of body |
| Belted | cinched at waist |
| Loose | flowing, not shaped |

Outerwear:

| | |
|---|---|
| Boxy | cut straight |
| Belted | cinched at the waist |
| Fitted | cut to hug curves of body |
| Tunic | a long, plain, close-fitting military jacket, usually with a stiff high collar |
| Flared | straight at top with more material at bottom |

Finally, all tops and dresses may be assigned neckline attributes as follows:

| | |
|---|---|
| Butterfly | large collar |
| Collarless | no collar |
| Spread | |
| Notched | |
| Buttoned | collar is secured to shirt by buttons |
| Ruffled | collar has gathered material around neck |
| Turtleneck | collar comes up to chin and folds over |
| V-neck | neck is shaped like inverted triangle |
| Strapless | shirt is held up under arm pits and around chest |
| Scoop | neck of shirt is rounded and falls several inches below neck |
| Tank | a sleeveless shirt |
| Funnel | |
| Square | neckline in two 90 degree angles |
| NormalRound | circular collar at base of neck |
| NormalCollar | the portion of a garment that goes around the neck and is sometimes folded over |
| Low V | neck is inverted triangle to or between breasts |
| MockTurtle | neck comes up to chin |
| Tabbed | a small, flat projection, such as a loop, strap, or flap |

Rules database 204 may contain a variety of different rules for selecting clothing and clothing accessories. The rules may include color, body type and climate rules. There are a variety of different color rules that may be utilized. Some rules may apply to all users and others may be tailored to a subset of users or a particular individual user. In one embodiment of the invention, the following color rules are used as a default set of color rules. A user may be given the option of modifying or adding color rules.

| COLOR | DOES NOT MATCH | COLOR | DOES NOT MATCH |
|---|---|---|---|
| Rust/Copper | red, dark red, medium red, bright red, light pastel red, open red, pink, dark pink, medium pink, bright pink, light pastel pink, open pink | Green | bright blue, turquoise/aqua, light pastel blue, red, dark red, medium red, bright red, light pastel red, open red, pink, dark pink, medium pink, bright pink, light pastel pink, open pink, yellow, dark yellow, medium yellow, bright yellow, light pastel yellow, open yellow, orange, dark orange, medium orange, bright orange, light pastel orange, open orange |

-continued

| COLOR | DOES NOT MATCH | COLOR | DOES NOT MATCH |
|---|---|---|---|
| Dark green | bright blue, turquoise/aqua, light pastel blue, red, dark red, medium red, bright red, light pastel red, open red, pink, dark pink, medium pink, bright pink, light pastel pink, open pink, yellow, dark yellow, medium yellow, bright yellow, light pastel yellow, open yellow, orange, dark orange, medium orange, bright orange, light pastel orange, open orange | Medium green | bright blue, turquoise/aqua, light pastel blue, red, dark red, medium red, bright red, light pastel red, open red, pink, dark pink, medium pink, bright pink, light pastel pink, open pink, yellow, dark yellow, medium yellow, bright yellow, light pastel yellow, open yellow, orange, dark orange, medium orange, bright orange, light pastel orange, open orange |
| Bright green | bright blue, turquoise/aqua, light pastel blue, red, dark red, medium red, bright red, light pastel red, open red, pink, dark pink, medium pink, bright pink, light pastel pink, open pink, yellow, dark yellow, medium yellow, bright yellow, light pastel yellow, open yellow, orange, dark orange, medium orange, bright orange, light pastel orange, open orange | Light pastel green | bright blue, red, dark red, medium red, bright red, light pastel red, open red, pink, dark pink, medium pink, bright pink, open pink, yellow, dark yellow, medium yellow, bright yellow, open yellow, orange, dark orange, medium orange, bright orange, light pastel orange, open orange |
| Open green | bright blue, turquoise/aqua, light pastel blue, red, dark red, medium red, bright red, light pastel red, open red, pink, dark pink, medium pink, bright pink, light pastel pink, open pink, yellow, dark yellow, medium yellow, bright yellow, light pastel yellow, open yellow, orange, dark orange, medium orange, bright orange, light pastel orange, open orange | Blue | yellow, dark yellow, medium yellow, bright yellow, light pastel yellow, open yellow, orange, dark orange, medium orange, bright orange, light pastel orange, open orange |
| Dark blue | yellow, dark yellow, medium yellow, bright yellow, light pastel yellow, open yellow, orange, dark orange, medium orange, bright orange, light pastel orange, open orange | Navy | yellow, dark yellow, medium yellow, bright yellow, light pastel yellow, open yellow, orange, dark orange, medium orange, bright orange, light pastel orange, open orange |
| Medium blue | yellow, dark yellow, medium yellow, bright yellow, light pastel yellow, open yellow, orange, dark orange, medium orange, bright orange, light pastel orange, open orange | Bright blue | green, dark green, medium green, bright green, light pastel green, open green, red, dark red, medium red, bright red, light pastel red, open red, yellow, dark yellow, medium yellow, bright yellow, light pastel yellow, open yellow, orange, dark orange, medium orange, bright orange, light pastel orange, open orange |
| Turquoise/aqua | green, dark green, medium green, bright green, open green, red, dark red, medium red, bright red, light pastel red, open red, orange, dark orange, medium orange, bright orange, light pastel orange, open orange | Light pastel blue | green, dark green, medium green, bright green, open green, red, dark red, medium red, bright red, light pastel red, open red, orange, dark orange, medium orange, bright orange, light pastel orange, open orange |
| Open blue | green, dark green, medium green, bright green, light pastel green, open green, red, dark red, medium red, bright red, light pastel red, open red, yellow, dark yellow, medium yellow, | Purple | red, dark red, medium red, bright red, light pastel red, open red, yellow, dark yellow, medium yellow, bright yellow, light pastel yellow, open yellow, orange, dark orange, medium |

-continued

| COLOR | DOES NOT MATCH | COLOR | DOES NOT MATCH |
| --- | --- | --- | --- |
| | bright yellow, light pastel yellow, open yellow, orange, dark orange, medium orange, bright orange, light pastel orange, open orange | | orange, bright orange, light pastel orange, open orange |
| Dark purple | red, dark red, medium red, bright red, light pastel red, open red, yellow, dark yellow, medium yellow, bright yellow, light pastel yellow, open yellow, orange, dark orange, medium orange, bright orange, light pastel orange, open orange | Medium purple | red, dark red, medium red, bright red, light pastel red, open red, yellow, dark yellow, medium yellow, bright yellow, light pastel yellow, open yellow, orange, dark orange, medium orange, bright orange, light pastel orange, open orange |
| Bright purple | red, dark red, medium red, bright red, light pastel red, open red, yellow, dark yellow, medium yellow, bright yellow, light pastel yellow, open yellow, orange, dark orange, medium orange, bright orange, light pastel orange, open orange | Light pastel purple | red, dark red, medium red, bright red, light pastel red, open red, yellow, dark yellow, medium yellow, bright yellow, open yellow, orange, dark orange, medium orange, bright orange, light pastel orange, open orange |
| Open purple | red, dark red, medium red, bright red, light pastel red, open red, yellow, dark yellow, medium yellow, bright yellow, light pastel yellow, open yellow, orange, dark orange, medium orange, bright orange, light pastel orange, open orange | Red | rust/copper, green, dark green, medium green, bright green, light pastel green, open green, bright blue, turquoise/aqua, light pastel blue, open blue, purple, dark purple, medium purple, bright purple, light pastel purple, open purple, pink, dark pink, medium pink, bright pink, light pastel pink, open pink, yellow, dark yellow, medium yellow, bright yellow, light pastel yellow, open yellow, orange, dark orange, medium orange, bright orange, light pastel orange, open orange |
| Dark red | rust/copper, green, dark green, medium green, bright green, light pastel green, open green, bright blue, turquoise/aqua, light pastel blue, open blue, purple, dark purple, medium purple, bright purple, light pastel purple, open purple, pink, dark pink, medium pink, bright pink, light pastel pink, open pink, yellow, dark yellow, medium yellow, bright yellow, light pastel yellow, open yellow, orange, dark orange, medium orange, bright orange, light pastel orange, open orange | Medium red | rust/copper, green, dark green, medium green, bright green, light pastel green, open green, bright blue, turquoise/aqua, light pastel blue, open blue, purple, dark purple, medium purple, bright purple, light pastel purple, open purple, pink, dark pink, medium pink, bright pink, light pastel pink, open pink, yellow, dark yellow, medium yellow, bright yellow, light pastel yellow, open yellow, orange, dark orange, medium orange, bright orange, light pastel orange, open orange |
| Bright red | rust/copper, green, dark green, medium green, bright green, light pastel green, open green, bright blue, turquoise/aqua, light pastel blue, open blue, purple, dark purple, medium purple, bright purple, light pastel purple, open purple, pink, dark pink, medium pink, bright pink, light pastel pink, open pink, yellow, dark yellow, medium yellow, bright yellow, | Light pastel red | rust/copper, green, dark green, medium green, bright green, light pastel green, open green, bright blue, turquoise/aqua, light pastel blue, open blue, purple, dark purple, medium purple, bright purple, light pastel purple, open purple, pink, dark pink, medium pink, bright pink, light pastel pink, open pink, yellow, dark yellow, medium yellow, bright yellow, light pastel |

-continued

| COLOR | DOES NOT MATCH | COLOR | DOES NOT MATCH |
|---|---|---|---|
| | yellow, light pastel yellow, open yellow, orange, dark orange, medium orange, bright orange, light pastel orange, open orange | | yellow, open yellow, orange, dark orange, medium orange, bright orange, light pastel orange, open orange |
| Open red | rust/copper, green, dark green, medium green, bright green, light pastel green, open green, bright blue, turquoise/aqua, light pastel blue, open blue, purple, dark purple, medium purple, bright purple, light pastel purple, open purple, pink, dark pink, medium pink, bright pink, light pastel pink, open pink, yellow, dark yellow, medium yellow, bright yellow, light pastel yellow, open yellow, orange, dark orange, medium orange, bright orange, light pastel orange, open orange | Pink | rust/copper, green, dark green, medium green, bright green, light pastel green, open green, red, dark red, medium red, bright red, light pastel red, open red, yellow, dark yellow, medium yellow, bright yellow, light pastel yellow, open yellow, orange, dark orange, medium orange, bright orange, light pastel orange, open orange |
| Dark pink | rust/copper, green, dark green, medium green, bright green, light pastel green, open green, red, dark red, medium red, bright red, light pastel red, open red, yellow, dark yellow, medium yellow, bright yellow, light pastel yellow, open yellow, orange, dark orange, medium orange, bright orange, light pastel orange, open orange | Medium pink | rust/copper, green, dark green, medium green, bright green, light pastel green, open green, red, dark red, medium red, bright red, light pastel red, open red, yellow, dark yellow, medium yellow, bright yellow, light pastel yellow, open yellow, orange, dark orange, medium orange, bright orange, light pastel orange, open orange |
| Bright pink | rust/copper, green, dark green, medium green, bright green, light pastel green, open green, red, dark red, medium red, bright red, light pastel red, open red, yellow, dark yellow, medium yellow, bright yellow, light pastel yellow, open yellow, orange, dark orange, medium orange, bright orange, light pastel orange, open orange | Light pastel pink | rust/copper, green, dark green, medium green, bright green, open green, red, dark red, medium red, bright red, light pastel red, open red, yellow, dark yellow, medium yellow, bright yellow, open yellow, orange, dark orange, medium orange, bright orange, light pastel orange, open orange |
| Open pink | rust/copper, green, dark green, medium green, bright green, light pastel green, open green, red, dark red, medium red, bright red, light pastel red, open red, yellow, dark yellow, medium yellow, bright yellow, light pastel yellow, open yellow, orange, dark orange, medium orange, bright orange, light pastel orange, open orange | Yellow | green, dark green, medium green, bright green, light pastel green, open green, blue, dark blue, navy, medium blue, bright blue, open blue, purple, dark purple, medium purple, bright purple, light pastel purple, open purple, red, dark red, medium red, bright red, light pastel red, open red, pink, dark pink, medium pink, bright pink, light pastel pink, open pink, orange, dark orange, medium orange, bright orange, light pastel orange, open orange |
| Dark yellow | green, dark green, medium green, bright green, light pastel green, open green, blue, dark blue, navy, medium blue, bright blue, open blue, purple, dark purple, medium purple, bright purple, light pastel purple, open purple, red, | Medium yellow | green, dark green, medium green, bright green, light pastel green, open green, blue, dark blue, navy, medium blue, bright blue, open blue, purple, dark purple, medium purple, bright purple, light pastel purple, open purple, red, |

-continued

| COLOR | DOES NOT MATCH | COLOR | DOES NOT MATCH |
|---|---|---|---|
| | dark red, medium red, bright red, light pastel red, open red, pink, dark pink, medium pink, bright pink, light pastel pink, open pink, orange, dark orange, medium orange, bright orange, light pastel orange, open orange | | dark red, medium red, bright red, light pastel red, open red, pink, dark pink, medium pink, bright pink, light pastel pink, open pink, orange, dark orange, medium orange, bright orange, light pastel orange, open orange |
| Bright yellow | green, dark green, medium green, bright green, light pastel green, open green, blue, dark blue, navy, medium blue, bright blue, open blue, purple, dark purple, medium purple, bright purple, light pastel purple, open purple, red, dark red, medium red, bright red, light pastel red, open red, pink, dark pink, medium pink, bright pink, light pastel pink, open pink, orange, dark orange, medium orange, bright orange, light pastel orange, open orange | Light pastel yellow | green, dark green, medium green, bright green, open green, blue, dark blue, navy, medium blue, bright blue, open blue, purple, dark purple, medium purple, bright purple, open purple, red, dark red, medium red, bright red, light pastel red, open red, pink, dark pink, medium pink, bright pink, open pink, orange, dark orange, medium orange, bright orange, open orange |
| Open yellow | green, dark green, medium green, bright green, light pastel green, open green, blue, dark blue, navy, medium blue, bright blue, open blue, purple, dark purple, medium purple, bright purple, light pastel purple, open purple, red, dark red, medium red, bright red, light pastel red, open red, pink, dark pink, medium pink, bright pink, light pastel pink, open pink, orange, dark orange, medium orange, bright orange, light pastel orange, open orange | Orange | green, dark green, medium green, bright green, light pastel green, open green, blue, dark blue, navy, medium blue, bright blue, turquoise/aqua, light pastel blue, open blue, purple, dark purple, medium purple, bright purple, light pastel purple, open purple, red, dark red, medium red, bright red, light pastel red, open red, pink, dark pink, medium pink, bright pink, light pastel pink, open pink, yellow, dark yellow, medium yellow, bright yellow, light pastel yellow, open yellow |
| Dark orange | green, dark green, medium green, bright green, light pastel green, open green, blue, dark blue, navy, medium blue, bright blue, turquoise/aqua, light pastel blue, open blue, purple, dark purple, medium purple, bright purple, light pastel purple, open purple, red, dark red, medium red, bright red, light pastel red, open red, pink, dark pink, medium pink, bright pink, light pastel pink, open pink, yellow, dark yellow, medium yellow, bright yellow, light pastel yellow, open yellow | Medium orange | green, dark green, medium green, bright green, light pastel green, open green, blue, dark blue, navy, medium blue, bright blue, turquoise/aqua, light pastel blue, open blue, purple, dark purple, medium purple, bright purple, light pastel purple, open purple, red, dark red, medium red, bright red, light pastel red, open red, pink, dark pink, medium pink, bright pink, light pastel pink, open pink, yellow, dark yellow, medium yellow, bright yellow, light pastel yellow, open yellow |
| Bright orange | green, dark green, medium green, bright green, light pastel green, open green, blue, dark blue, navy, medium blue, bright blue, turquoise/aqua, light pastel blue, open blue, purple, dark purple, medium | Light pastel orange | green, dark green, medium green, bright green, light pastel green, open green, blue, dark blue, navy, medium blue, bright blue, turquoise/aqua, light pastel blue, open blue, purple, dark purple, medium purple, |

-continued

| COLOR | DOES NOT MATCH | COLOR | DOES NOT MATCH |
|---|---|---|---|
| | purple, bright purple, light pastel purple, open purple, red, dark red, medium red, bright red, light pastel red, open red, pink, dark pink, medium pink, bright pink, light pastel pink, open pink, yellow, dark yellow, medium yellow, bright yellow, light pastel yellow, open yellow | | bright purple, light pastel purple, open purple, red, dark red, medium red, bright red, light pastel red, open red, pink, dark pink, medium pink, bright pink, light pastel pink, open pink, yellow, dark yellow, medium yellow, bright yellow, open yellow |
| Open orange | green, dark green, medium green, bright green, light pastel green, open green, blue, dark blue, navy, medium blue, bright blue, turquoise/aqua, light pastel blue, open blue, purple, dark purple, medium purple, bright purple, light pastel purple, open purple, red, dark red, medium red, bright red, light pastel red, open red, pink, dark pink, medium pink, bright pink, light pastel pink, open pink, yellow, dark yellow, medium yellow, bright yellow, light pastel yellow, open yellow | | |

A rule may be added to indicate that the following colors match everything: gold, black, oxford, charcoal, grey, dark grey, medium grey, silver, light pastel grey, open grey, white, natural, open white, brown, dark brown, medium brown, light pastel brown, open brown, beige/khaki, dark beige, medium beige, light beige and open beige.

The following category rules may be used to match different articles of clothing and accessories. A value of "1" corresponds to the items forming a strong match, while "2" corresponds to the items sometimes forming a match and "3" corresponds to the items never forming a match.

| | Pear | Triangle | Round | Hourglass | Inverted Triangle | Rectangle |
|---|---|---|---|---|---|---|
| | Pants | | | | | |
| | (1) Looks best if medium to tall | | | | | |
| | (2) Looks best with a long top | | | | | |
| Slim | 1 | 3 | 2(2) | 1 | 1 | 2(2) |
| Baggy | 2(1) | 3 | 2(1) | 2(1) | 2(1) | 2(1) |

| | Sweaters | Casual Tops | Blouses | Dress Pants | Blazers | Skirts | Casual Pants | Outerwear | Suits | Dresses | Shoes | Accessories |
|---|---|---|---|---|---|---|---|---|---|---|---|---|
| Sweaters | 2 | 2 | 2 | 1 | 1 | 1 | 1 | 1 | 1 | 2 | 1 | 1 |
| Casual Tops | 2 | 1 | 3 | 3 | 3 | 1 | 1 | 1 | 3 | 2 | 1 | 1 |
| Blouses & Shirts | 2 | 3 | 3 | 1 | 1 | 1 | 2 | 1 | 1 | 3 | 1 | 1 |
| Dress Pants | 1 | 3 | 1 | 3 | 1 | 3 | 3 | 1 | 3 | 3 | 1 | 1 |
| Blazers | 1 | 3 | 1 | 1 | 3 | 1 | 2 | 1 | 3 | 3 | 1 | 1 |
| Skirts | 1 | 1 | 1 | 3 | 1 | 3 | 3 | 1 | 3 | 3 | 1 | 1 |
| Casual Pants | 1 | 1 | 2 | 3 | 2 | 3 | 3 | 1 | 3 | 3 | 1 | 1 |
| Outerwear | 1 | 1 | 1 | 1 | 1 | 1 | 1 | 3 | 1 | 1 | 1 | 1 |
| Suits | 1 | 3 | 1 | 3 | 3 | 3 | 3 | 1 | 3 | 3 | 1 | 1 |
| Dresses | 2 | 2 | 3 | 3 | 3 | 3 | 3 | 1 | 3 | 3 | 1 | 1 |
| Shoes | 1 | 1 | 1 | 1 | 1 | 1 | 1 | 1 | 1 | 1 | 3 | 1 |
| Accessories | 1 | 1 | 1 | 1 | 1 | 1 | 1 | 1 | 1 | 1 | 1 | 1 |

Body type attributes have been described above. Inference engine server 202 may apply the following body type rules based on the body type attribute provided by the user. A value of "1" corresponds to the items strongly matching the body type, while "2" corresponds to the items sometimes matching the body type and "3" corresponds to the items never matching the body type.

-continued

| | Pear | Triangle | Round | Hourglass | Inverted Triangle | Rectangle |
|---|---|---|---|---|---|---|
| Straight | 3 | 3 | 2(2) | 3 | 1 | 1 |
| Bootleg | 3 | 3 | 3 | 2(1) | 2(1) | 3 |

-continued

|  | Pear | Triangle | Round | Hourglass | Inverted Triangle | Rectangle |
|---|---|---|---|---|---|---|
| Tapered | 1 | 1 | 2(2) | 1 | 3 | 2(2) |
| Bellbottom | 3 | 3 | 3 | 2(1) | 2(1) | 3 |

Skirts
(1) Looks best if medium to tall
(2) Looks best with long top

|  | Pear | Triangle | Round | Hourglass | Inverted Triangle | Rectangle |
|---|---|---|---|---|---|---|
| A-Line | 1 | 3 | 3 | 2(1) | 2(1) | 3 |
| Straight | 2(2) | 2(2) | 2(2) | 1 | 2(2) | 1 |
| Full | 3 | 3 | 3 | 1 | 3 | 3 |
| Flared | 1 | 3 | 3 | 1 | 2(2) | 1 |
| Tailored | 1 | 3 | 2(2) | 1 | 1 | 2(2) |
| Wrapped | 1 | 1 | 3 | 1 | 1 | 1 |
| Pleated | 2(2) | 2(2) | 2(2) | 3 | 2(2) | 2(2) |

Tops

|  | Pear | Triangle | Round | Hourglass | Inverted Triangle | Rectangle |
|---|---|---|---|---|---|---|
| Wrapped | 1 | 3 | 3 | 1 | 1 | 1 |
| Fitted | 1 | 3 | 3 | 1 | 3 | 3 |
| Tunic | 1 | 1 | 1 | 1 | 1 | 1 |
| Regular | 1 | 3 | 3 | 1 | 1 | 3 |
| Boxy | 1 | 1 | 3 | 1 | 3 | 3 |
| Belted | 1 | 3 | 3 | 1 | 1 | 1 |

Dresses
(1) Looks best if medium to tall

|  | Pear | Triangle | Round | Hourglass | Inverted Triangle | Rectangle |
|---|---|---|---|---|---|---|
| A-Line | 1 | 3 | 3 | 1 | 1 | 3 |
| Straight | 3 | 1 | 1 | 3 | 1 | 1 |
| Full | 3 | 1 | 1 | 3 | 2(1) | 1 |
| Trapeze | 3 | 1 | 1 | 3 | 3 | 1 |
| Contoured | 3 | 3 | 3 | 1 | 3 | 3 |
| Belted | 2(1) | 3 | 3 | 2(1) | 1 | 3 |
| Wrapped | 1 | 1 | 1 | 1 | 1 | 1 |

Suits

|  | Pear | Triangle | Round | Hourglass | Inverted Triangle | Rectangle |
|---|---|---|---|---|---|---|
| Tailored | 1 | 1 | 1 | 3 | 1 | 1 |
| Boxy | 1 | 3 | 3 | 1 | 1 | 3 |
| Contoured | 3 | 3 | 3 | 1 | 3 | 3 |
| Belted | 1 | 3 | 3 | 1 | 1 | 3 |
| Loose | 3 | 1 | 1 | 3 | 1 | 1 |

Outerwear

|  | Pear | Triangle | Round | Hourglass | Inverted Triangle | Rectangle |
|---|---|---|---|---|---|---|
| Boxy | 1 | 3 | 3 | 1 | 1 | 3 |
| Belted | 1 | 3 | 3 | 1 | 1 | 3 |
| Fitted | 1 | 1 | 1 | 3 | 1 | 1 |
| Tunic | 1 | 1 | 1 | 1 | 1 | 1 |
| Flared | 3 | 1 | 1 | 3 | 1 | 1 |

Climate rules may be utilized to match clothing having predetermined material attributes with the current or predicted weather conditions. In one embodiment of the invention, rules database 204 may include rules for matching a climate attribute of "cold" with clothing having a material attribute of: velvet, thick wools, fur, leather, camelhair, mohair, wool, cashmere, nylon, acrylic, rayon, polyester, denim, blend or silk. A climate attribute of "mild" may be used to select clothing having a material attribute of: wool, cashmere, angora, mohair, silk, cotton, nylon, acrylic, rayon, polyester, denim or blend. A climate attribute of "warm" may be used to select clothing having a material attribute of: wool lightweight, tweed, cashmere, wool knit, wool crepe, silk thick, silk knit, synthetic fibers, cotton, chiffon, organza, tulle, lace, nylon, acrylic, rayon, polyester, denim, blend, silk or wool. A climate attribute of "hot" may be used to select clothing having a material attribute of: linen, shantung, cotton, silk, nylon, straw, poplin, seersucker, spandex, canvas, nylon, acrylic, rayon, polyester, denim or blend. Clothing having a material attribute of wool gabardine or cotton broadcloth may correspond to a climate attribute of "all-year." In one embodiment of the invention, there are no rules for selecting accessories and shoes based on climate attributes.

Returning to FIG. 3 again, in step 306, the user transmits the identification of a first article of clothing and a set of rules to the rules engine. The identification may include a product identification number, one or more attributes a user identification and the type of search. In an alternative embodiment, the user may transmit the identification of an article of clothing and one or more rules to the rules engine. Finally, in step 308, the user receives an identification of a second article of clothing that satisfies the set of rules. Of course, the user may receive the identification of several articles of clothing that form a coordinated outfit. The identification may be in the form of an image of the second article of clothing, an image of the first and second articles of clothing, a product number or any other identifying information.

Figure 6:
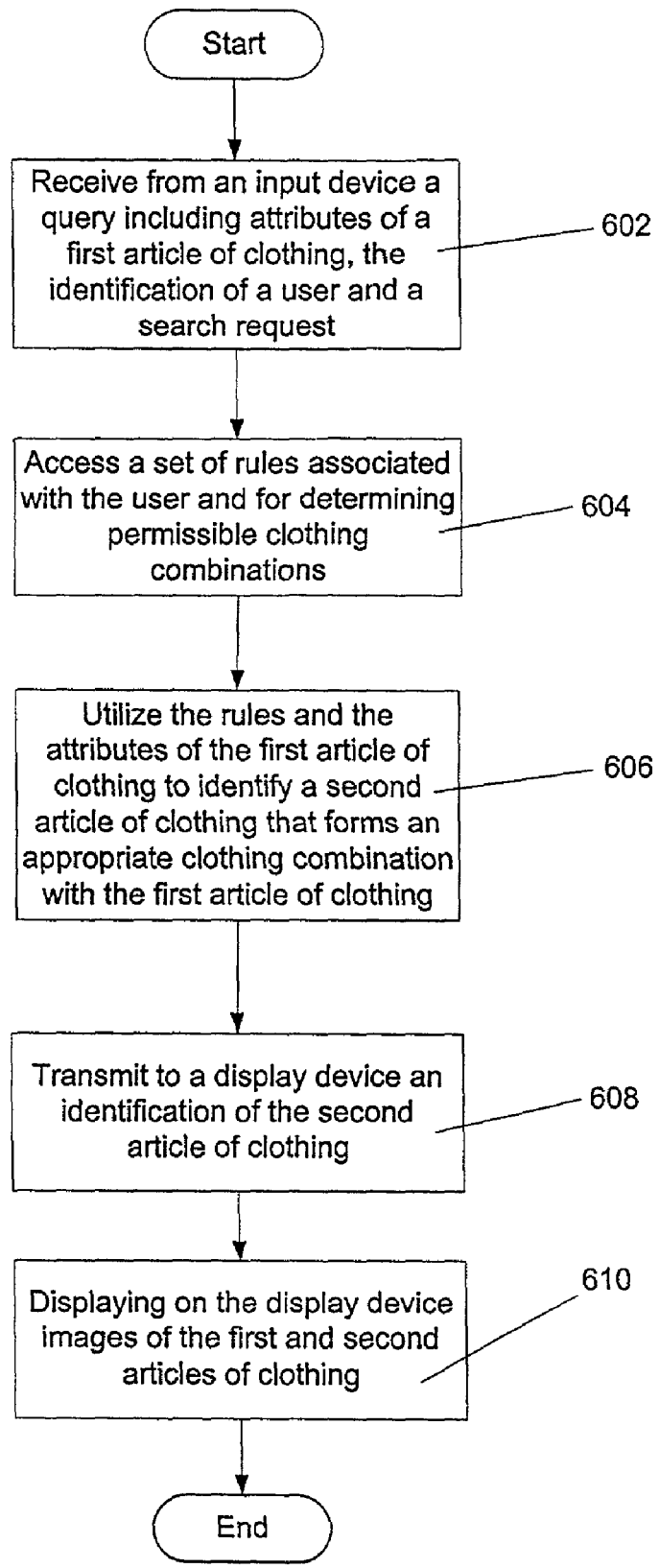
FIG. 6 illustrates a method of selecting clothing based on the attributes of a piece of clothing in accordance with an embodiment of the invention.

FIG. 6 illustrates a method of selecting clothing that may be performed by inference engine server 202. In step 602, inference engine server 202 receives from an input device a query including characteristics of a first article of clothing, the identification of a user and a search request. The input device may be implemented the computer 216 and may include a user application that includes a graphical user interface. Of course, inference engine server 202 may be directly coupled to computer 216 or computer 216 may perform the functions described above with reference to inference engine server 202. Next, in step 604, inference engine server 202, accesses a set of rules associated with the user and for determining permissible clothing combinations The rules may be based at least in part on the attributes described above. Inference engine server 202 then utilizes the rules and the characteristics of the first article of clothing to identify a second article of clothing that forms an appropriate clothing combination with the first article of clothing in step 606 and transmits an identification of the second article of clothing to a display device in step 608. Finally, in step 610, images of the first and second articles of clothing may be displayed on a display device. The display device may form part of the input device. Alternatively, the display device may be separate from the input device. For example, the input device may be implement with a wireless handheld device and the display device may form part of a kiosk included in a store.

Figure 7:
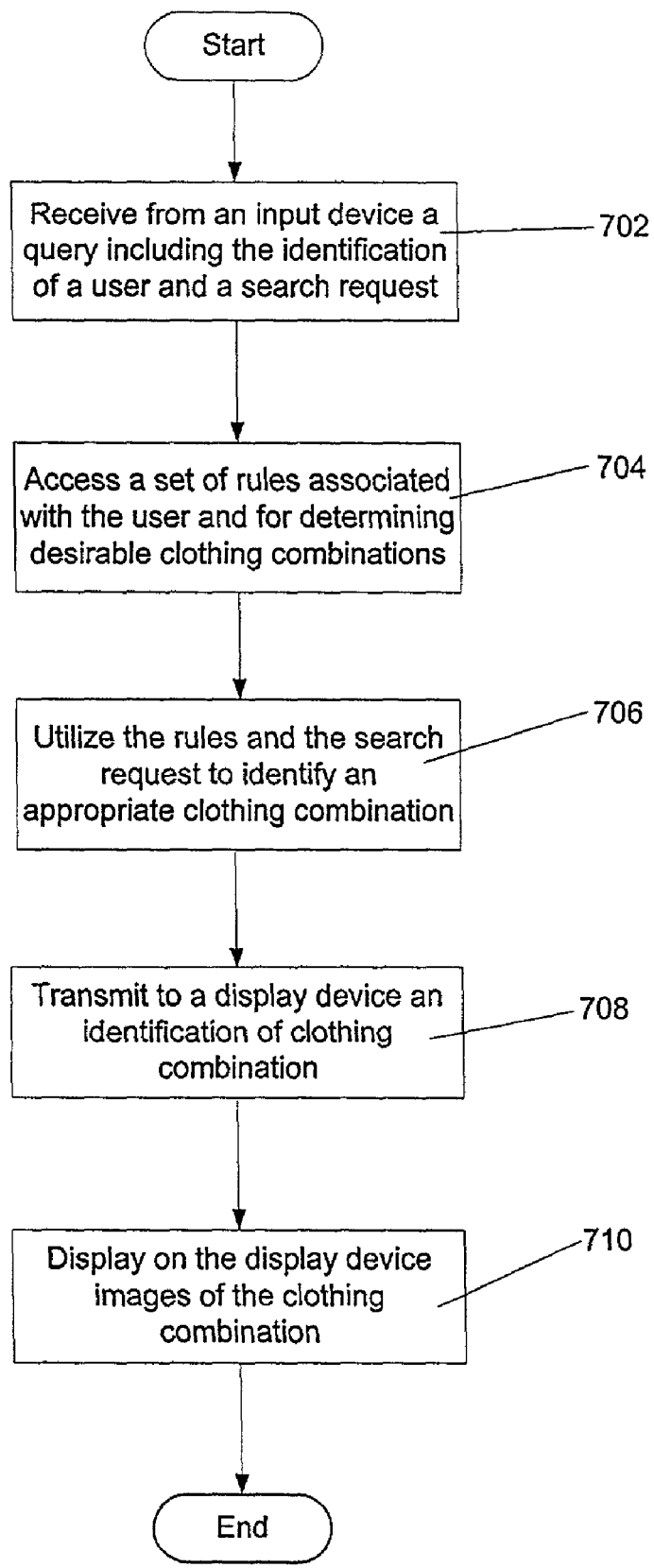
FIG. 7 illustrates a method of selecting clothing based on the identification of a user and a search request in accordance with an embodiment of the invention.

The present invention is not limited to selecting articles of clothing that match an article of clothing selected by the user. FIG. 7 illustrates another method that may be performed to select clothing. In step 702, inference engine server 202 receives from the input device a query including the identification of a user and a search request. The search request may identify an occasion, an image of clothing worn by a celebrity or any other request for the inference engine to select a clothing combination. Next, in step 704, inference engine server 202 accesses a set of rules associated with the user and for determining desirable clothing combinations. The rules and the search request are utilized to identify an appropriate clothing combination in step 706. An identification of the clothing combination is transmitted to the display device in step 708. Finally, in step 710, the clothing combination may be displayed on the display device.

Figure 8:
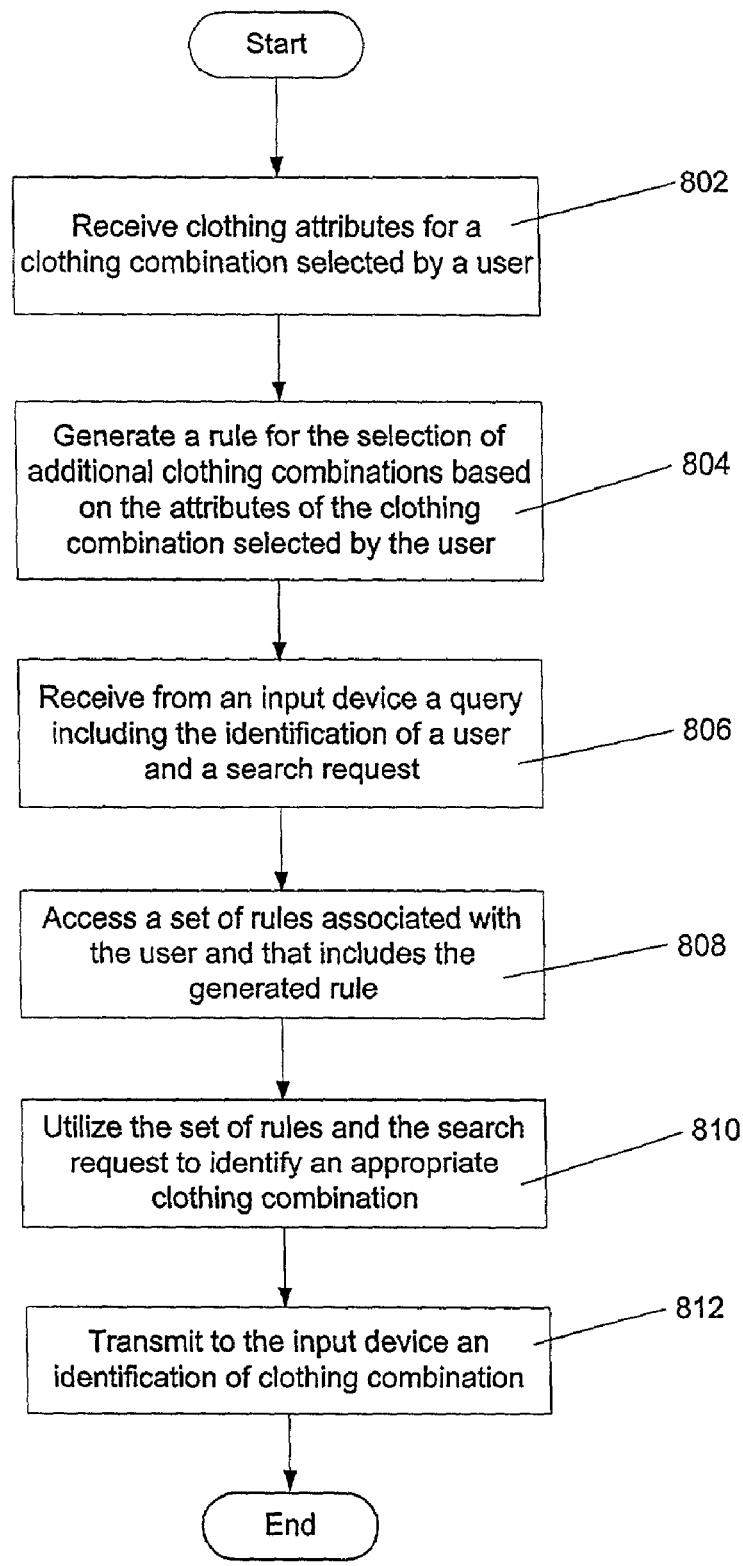
FIG. 8 illustrates a method of selecting clothing based on a rule generated by a user in accordance with an embodiment of the invention.

The system illustrated in FIG. 2 may also allow users to edit or create rules. FIG. 8 illustrates one method that may be implemented by inference engine server 202 to select clothing based on user-generated rules. In step 802, inference engine server 202 receives clothing attributes for a clothing combination selected by a user. The attributes may relate to clothing combinations the user likes or dislikes. For example, the user may indicate that the user does not like to wear black shirts with blue pants. The user may also provide information from a person pictured in a magazine. In step 804, inference engine server 202 generates a rule for the selection of additional clothing combinations based on the attributes of the clothing combination selected by the user. Inference engine server 202 may display a list of attributes of the selected clothing combination and prompt the user to identify which attributes the user likes or dislikes. Next, in step 806, a query that includes the identification of the user and a search request may be received from an input device in the manner described above. A set of rules associated with the user is accessed in step 808. The set of rules includes the generated rule. The search is performed in step 810. In step 812, an identification of the clothing combination is transmitted to a display device.

In addition to the disclosed uses, the present invention may be used to train clothing sales personnel. In one embodiment, the sales personnel may select clothing combinations after reviewing an image of a consumer. The selected combination may be transmitted to inference engine server 202 to determine if the clothing is appropriate for the attributes of the consumer. Of course, the sales personnel may be presented with more than one image and may also receive a list of attributes. Similarly, the disclosed systems and methods may be used to determine whether the inventory or assortment within a store matches the desires of the targeted consumers.

While the present invention has been described in connection with the illustrated embodiments, it will be appreciated and understood that modifications may be made without departing from the true spirit and scope of the invention. For example, a local area network or wide area network may be substituted for the Internet 208 (shown in FIG. 2). Furthermore, elements of the disclosed invention may be used to select home furnishings, consumer electronics and/or other products.

We claim:

1. A method of identifying clothing combinations, the method comprising:
   (a) identifying a first article of clothing and a search request by reading a tag embedded in a material of the first article of clothing;
   (b) identifying a set of rules for selecting clothing combinations;
   (c) transmitting a first article identification of the first article of clothing that is associated with a corresponding clothing category, the search request and an identifier that identifies the set of rules to a rules engine, wherein the identifier identifies one of a plurality of rule sets;
   (d) receiving a second article identification of a second article of clothing that satisfies the set of rules and that has a largest level of category matching for all category attribute pairs related to the corresponding clothing category, the set of rules providing an associated level of matching for each said category attribute pair, the second article of clothing being associated with a different clothing category than the corresponding clothing category; and
   (e) obtaining a selected identification of a selected clothing combination by comparing other attribute pairs that are related to the second article of clothing and that relate a first attribute and a second attribute, each said other attribute pair having an associated degree of matching, the selected clothing combination having a largest degree of matching of all said other attribute pairs.

2. The method of claim 1, wherein the set of rules includes rules for permissible color combinations.

3. The method of claim 1, wherein the set of rules include rules for permissible pattern combinations.

4. The method of claim 1, wherein (a) comprises selecting the first article of clothing from a selection of clothing in a brick and mortar store.

5. The method of claim 1, wherein (a) comprises selecting the first article of clothing from a selection of clothing offered for sale by a web site.

6. The method of claim 1, wherein the first and second articles of clothing are owned by the same person.

7. The method of claim 1, wherein the first article of clothing is part of a user's current wardrobe and the second article of clothing is not part of the user's current wardrobe.

8. The method of claim 1, wherein the first article of clothing is not owned by a user.

9. The method of claim 1, wherein (b) comprises identifying an owner of the first article of clothing and associating the owner with the set of rules.

10. The method of claim 1, further including:
    (e) receiving the identification of a third article of clothing that satisfies the search request.

11. The method of claim 1, further comprising:
    (e) editing the set of rules based on an input from a user.

12. The method of claim 1, wherein the identification includes associated information selected from the group consisting of a product identification number, at least one attribute, a user identification, and a type of search.

13. The method of claim 1, wherein the identification of the second article of clothing is based on the set of rules and at least one characteristic of the first article of clothing.

14. The method of claim 1, wherein the tag is woven in the material of the first article of clothing.

15. The method of claim 1, further comprising:
    (f) summing amounts of matching for associated attribute pairs for one of the clothing combinations;
    (g) repeating (f) for another clothing combination; and
    (h) in response to (f) and (g), determining the selected clothing combination.

16. The method of claim 1, further comprising:
    (e) presenting, to a user, a plurality of search request types;
    (f) obtaining, from the user, a selected search request type from the plurality of search request types; and
    wherein (b) comprises:
       (b)(i) determining the set of rules from the selected search request type.

* * * * *